(12) United States Patent
Shih

(10) Patent No.: US 6,342,119 B1
(45) Date of Patent: Jan. 29, 2002

(54) MANUFACTURING METHOD OF A COMPOUND SUBSTRATE FOR LIGHT-REFLECTIVE APPLICATION

(76) Inventor: Ying-Chi Shih, 3F-1, No. 342, Chang An Rd., Ta Tung Dist., Taipei (TW)

( * ) Notice: Subject to any disclaimer, the term of this patent is extended or adjusted under 35 U.S.C. 154(b) by 0 days.

(21) Appl. No.: 09/435,372

(22) Filed: Nov. 8, 1999

(51) Int. Cl.⁷ .......................... B32B 31/04; G02B 5/128
(52) U.S. Cl. .................. 156/182; 156/241; 156/247; 156/277; 156/384; 428/200; 428/202; 428/913; 359/170; 359/518; 359/536
(58) Field of Search ................................ 156/234, 237, 156/238, 241, 247, 182, 277, 344, 289, 384, 583.1, 584; 428/200, 202, 913, 143, 149, 187, 323; 359/170, 518, 536, 538, 540, 530

(56) References Cited

U.S. PATENT DOCUMENTS 4,664,735 A * 5/1987 Pernicano .................... 156/240
4,849,265 A * 7/1989 Ueda et al. .................... 428/40
5,988,822 A * 11/1999 Abe et al. .................... 359/541

* cited by examiner

Primary Examiner—Richard Crispino
Assistant Examiner—Cheryl N. Hawkins
(74) Attorney, Agent, or Firm—Rosenberg, Klein & Lee

(57) ABSTRACT

A manufacturing method of a compound substrate for light-reflective application is proposed, by which the mechanical utility can be simplified, the cost is reduced and the light-reflective article made by the compound substrate has uniform light-reflecting effect. The manufacturing method of a compound substrate according to the present invention comprises the steps of: A) preparing a first substrate and a second substrate; B) coating a binding agent over the first substrate, coating a plurality of uniform light-emitting beads over the binding agent, printing a dye layer of multiple color on one surface of the second substrate with a printing roller; C) binding the surface of the first substrate coated with the light-emitting beads with the surface of the second substrate coated with the dye layer by hot-pressing with a heated roller, tearing away the second substrate, hot-pressing again with the heated roller such that the light-emitting beads are exposed out of the dye layer; D) covering a thin protecting film over the light-emitting beads to protect the light-emitting beads, thus forming a reflective printing on the first substrate.

8 Claims, 3 Drawing Sheets

1, Preparing a first substrate and a second substrate.

2, Coating a binding agent over the first substrate, coating a plurality of uniform light-emitting beads over the binding agent.

3, Printing a dye layer on the second substrate.

4, Binding the first substrate and the second substrate by hot-pressing with a heated roller.

5, Tearing away the second substrate.

6, Hot-pressing again with the heated roller.

7, Covering the light-emitting beads with a thin protecting film.

8, Finished compound substrate.

FIG. 1

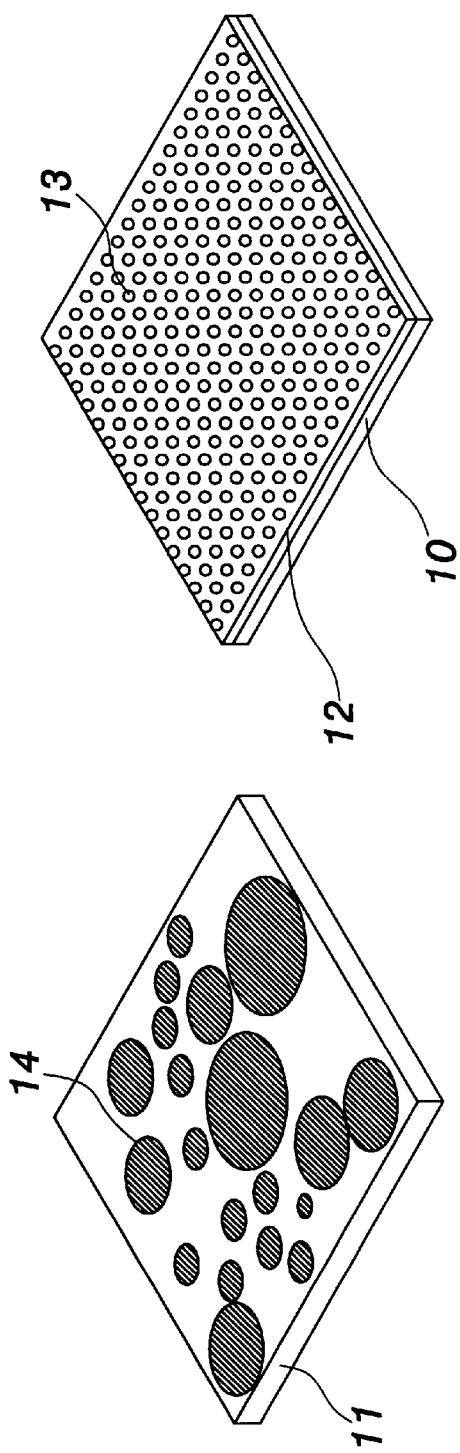
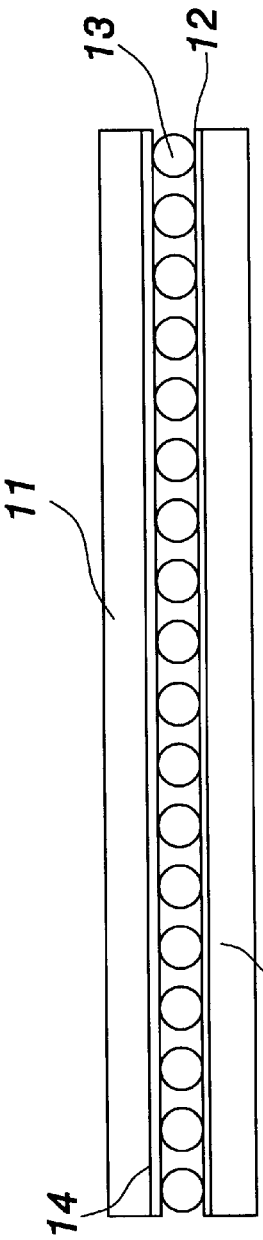
FIG. 2
FIG. 3

MANUFACTURING METHOD OF A COMPOUND SUBSTRATE FOR LIGHT-REFLECTIVE APPLICATION

FIELD OF THE INVENTION

The present invention relates to a manufacturing method of a compound substate for light-reflective application, especially to a manufacturing method of a compound substrate for light-reflective application, by which the mechanical utility can be simplified, the cost is reduced and the light-reflective article made by the compound substrate has uniform light-reflecting effect.

BACKGROUND OF THE INVENTION

The conventional light-reflective printing is generally printed on a substrate to provide light-reflecting effect However, the conventional multiple-color light-reflective printings can not be printed on substrates simultaneously. The processing means such as a printing roller can only perform mono-color printing rather than multiple color printing. Therefore, the color can not be precisely registered and the coloring of light-emitting beads is difficult.

Therefore, the light-emitting beads are pre-processed by applying a background color on the light-emitting beads (multiple color). However, the color-printing of light-emitting beads is non-uniform because he light-emitting beads are entangled with each other. Therefore, a waterproof glue is applied to the light-emits beads to protect the light-emitting beads. However, the cost is high, the reflecting effect is not uniform and the design of mechanical utility is not easy.

It is an object of the invention to provide a manufacturing method of a compound substrate for light-reflective application, by which the mechanical utility can be simplified, the cost is reduced and the light-reflective article made by the compound substrate has a uniform light-reflecting effect.

To achieve the above object, the manufacturing method of compound substrate according to the present invention comprises the steps of: A) preparing a first substrate and a second substrate; B) coating a binding agent over the first substrate, coating a plurality of uniform light-emitting beads over the binding agent, printing a dye layer of multiple color on one surface of the second substrate with a printing roller; C) binding the surface of the first substrate coated with the light-emitting beads with the surface of the second substrate coated with the dye layer by hot-pressing with a heated roller, tearing away the second substrate, hot-pressing again with the heated roller such that the light-emitting beads are exposed out of the dye layer; D) covering a thin protecting film over the light-emitting beads to protect the light-emitting beads, thus forming a reflective printing on the first substrate.

The various objects and advantages of the present invention will be more readily understood from the following detailed description when read in conjunction with the appended drawings, in which:

BRIEF DESCRIPTION OF DRAWINGS:

FIG. 1 is the flowchart of the manufacturing method according to the present invention; and FIGS. 2 to 6 are views corresponding to each step in the flowchart of FIG. 1.

DETAILED DESCRIPTION OF THE PREFERRED EMBODIMENT

Figure 4:
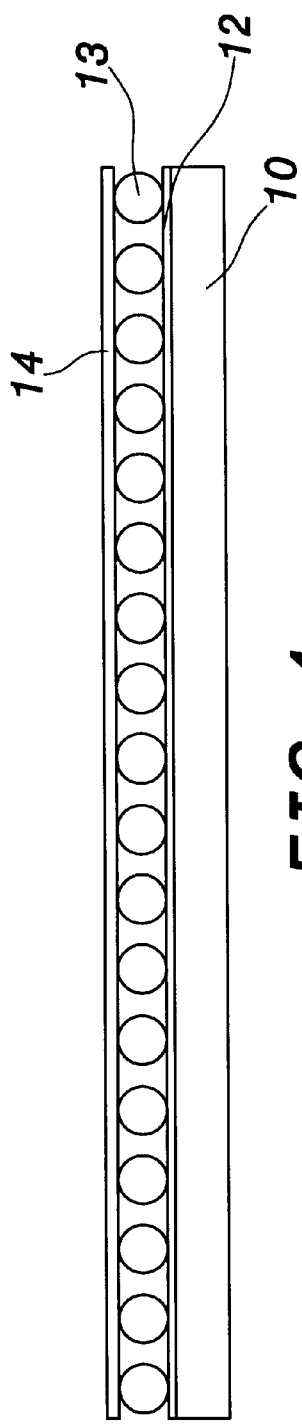
Figure 5:
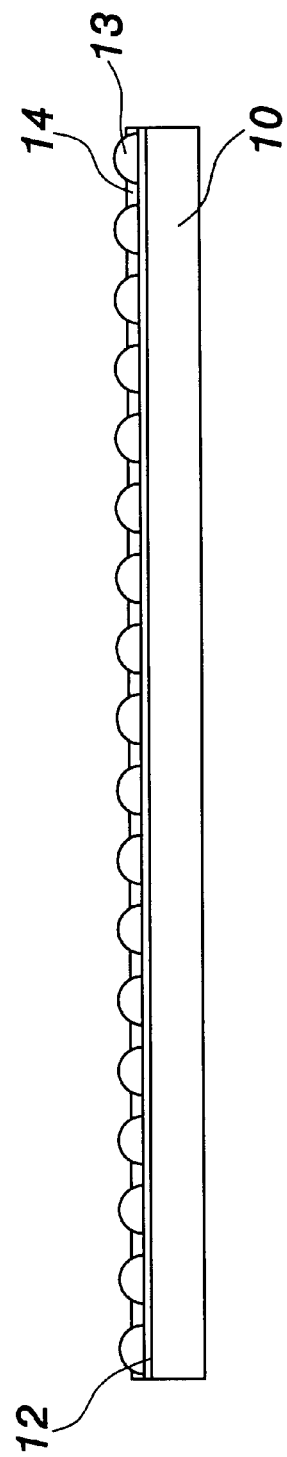
Figure 6:
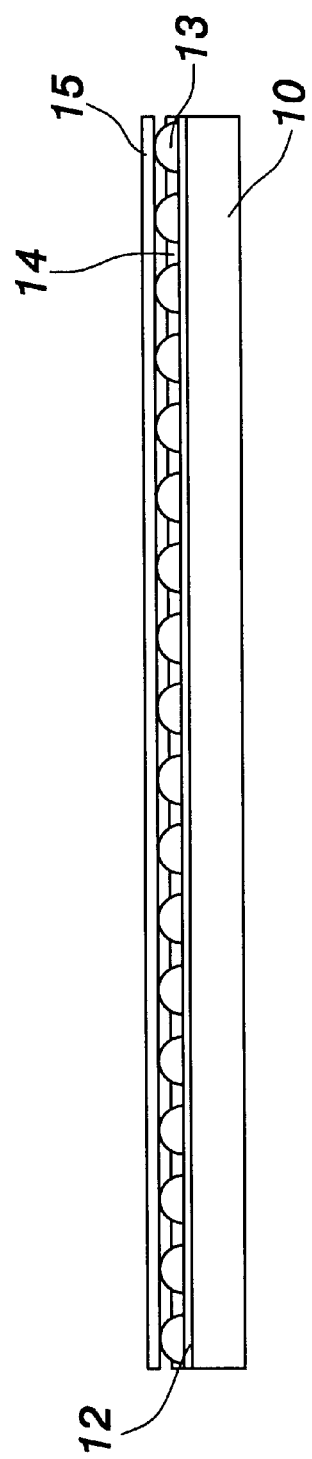

The present invention is intended to provide a manufacturing method of a compound substrate for light-reflective usage, by which the mechanical utility can be simplified, the cost is reduced and the light-reflective article made by the compound substrate has a uniform light-reflecting effect. FIG. 1 is the flowchart of the manufacturing method according to the present invention. As shown in this figure, the manufacturing method according to the present invention comprises the following steps:

A) preparing a first substrate 10 made of cloth or plastic, as shown in FIG. 2, a second substrate 11 made of polyethylene terephthalate (PET), polypropylene (PP) or paper. Moreover, the material of the first substrate 10 can also be selected from the group consisting nylon, polyester, denim, cotton, spandex, rayon, and knit. Moreover, the material of the first substrate 10 can also be plastic leather such as polyurethane or polyvinyl chloride, B) coating a binding agent 12 on one surface of the first substrate 10 and coating a plurality of uniform light-emitting beads 13 over the binding agent 12, printing a dye layer 14 of multiple color on one surface of the second substrate 11 with printing roller; wherein the light-emitting beads 13 can be glass beads with light-reflecting effect or phosphor balls which luminesce when absorbing light such as sun light and light from a fluorescent lamp;

C) binding the surface of the first substrate 10 coated with the light-emitting beads 13 with the surface of the second substrate 11 coated with the dye layer 14 by hot-pressing with a roller heated to 170–230° C., as shown in FIG. 3, tearing away the second substrate 11 as shown in FIG. 4, hot-pressing again with a heated roller such that the light-emitting beads 13 on the first substrate 10 exposes out of the dye layer 14 as shown in FIG. 5, the dye layer 14 is easy to collapse during the first hot-pressing process and moves to the bottom portion of the light-emitting beads 13 during the second hot-pressing process and becomes adhered to the light-emitting beads 13;

D) covering a thin protecting film 15 made of PU over the light-emitting beads 13 as shown in FIG. 6 to protect the light-emitting beads 13, thus forming a reflective printing on the first substrate 10.

The manufacturing method of a compound substrate for light-reflective application according to the present invention is a simple process, uses simple mechanical utility and produces a product with a uniform light reflecting effect.

Although the present invention has been described with reference to the preferred embodiment thereof, it will be understood that the invention is not limited to the details thereof. Various substitutions and modifications have been suggested in the foregoing description, and others will occur to those of ordinary skill in the art. Therefore, all such substitutions and modifications are intended to be embraced within the scope of the invention as defined in the appended claims.

I claim:

1. A manufacturing method of a compound substrate for light-reflective application comprising the steps of:

A) preparing a first substrate and a second substrate;

B) coating a binding agent over said first substrate, coating a plurality of uniform light-emitting beads over said binding agent, printing a dye layer of multiple color on one surface of said second substrate with a printing roller;

C) binding the surface of said first substrate coated with said light-emitting beads with the surface of said second substrate coated with said dye layer by hot-pressing with a heated roller, tearing away said second substrate, hot-pressing again with said heated roller such that said light-emitting beads are exposed out of said dye layer D) covering a thin protecting film over the light-emitting beads to protect the light-emitting beads, thus forming a reflective printing on said first substrate.

2. The manufacturing method of a compound substrate for light-reflective application as in claim 1, wherein said first substrate in step A is a cloth.

3. The manufacturing method of a compound substrate for light-reflective application as in claim 2, wherein said cloth can be selected from the group consisting nylon, polyester, denim, cotton, spandex, rayon, and knit.

4. The manufacturing method of a compound substrate for light-reflective application as in claim 1, wherein said first substrate in step A is a plastic.

5. The manufacturing method of a compound substrate for light-reflective application as in claim 4, wherein said first substrate is a plastic leather including polyurethane and polyvinyl chloride.

6. The manufacturing method of a compound substrate for light-reflective application as in claim 1, wherein said first substrate in step A can be selected from the group consisting polyethylene terephthalate, polypropylene, and paper.

7. The manufacturing method of a compound substrate for light-reflective application as in claim 1, wherein in step C said first substrate and said second substrate are hot-pressed with a roller heated to 170–230° C.

8. The manufacturing method of a compound substrate for light-reflective application as in claim 1, wherein said protecting film in step D is a polyurethane.

* * * * *